March 9, 1971 W. R. DAPPRICH 3,568,434
TURBO-CHARGER INITIATOR SYSTEM
Filed Nov. 4, 1968 3 Sheets-Sheet 1

INVENTOR
WILLIAM R. DAPPRICH

BY
ROBERT U. GEIB, JR
ATTORNEY

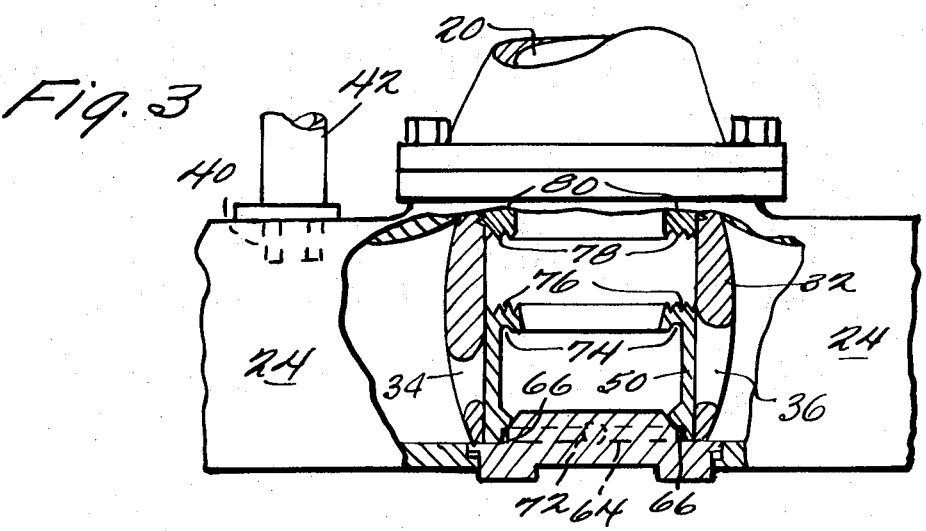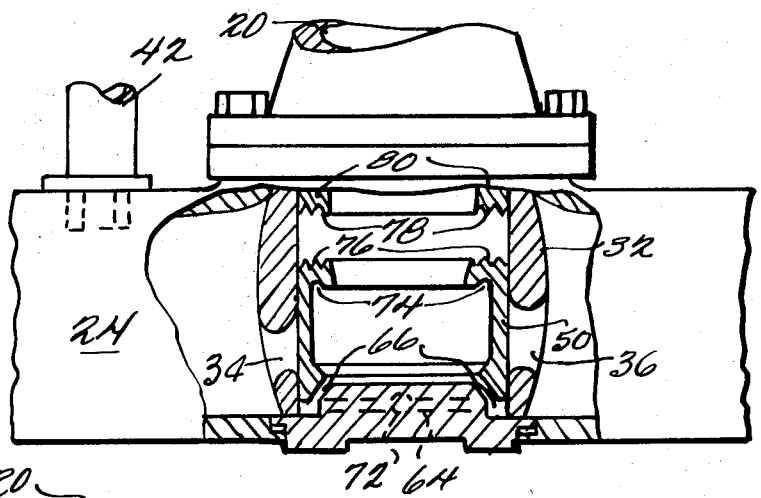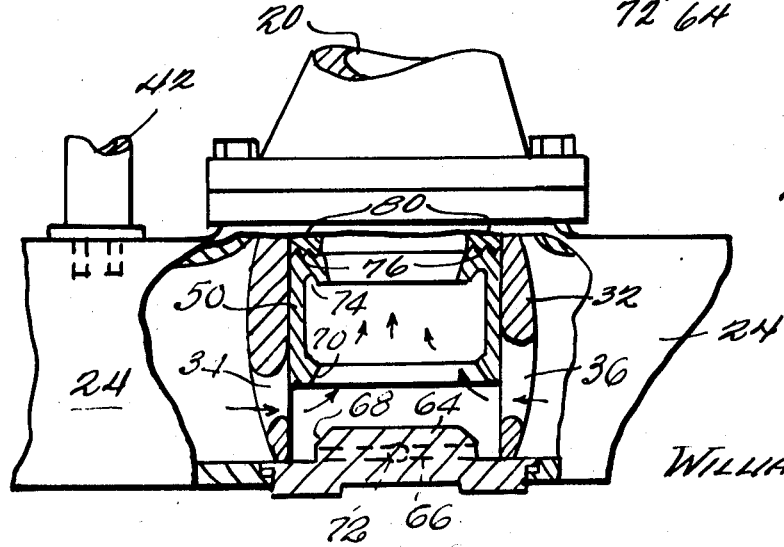

March 9, 1971

W. R. DAPPRICH 3,568,434

TURBO-CHARGER INITIATOR SYSTEM

Filed Nov. 4, 1968

INVENTOR
WILLIAM R. DAPPRICH

BY
ROBERT U. GEIB Jr.
ATTORNEY

United States Patent Office 3,568,434
Patented Mar. 9, 1971

3,568,434
TURBO-CHARGER INITIATOR SYSTEM
William R. Dapprich, P.O. Box 112,
Murrysville, Pa. 15668
Filed Nov. 4, 1968, Ser. No. 773,253
Int. Cl. F02b 37/00
U.S. Cl. 60—13                          2 Claims

ABSTRACT OF THE DISCLOSURE

Air and exhaust gas trapped in the exhaust manifold of the internal combustion engine of a turbo-compressor unit is directed through a bypass piping and distribution manifold system against the blades of the turbine, thus accelerating the turbine rotor up to useful speeds prior to the firing of the internal combustion engine; and the compressor side of the turbo-charger builds up and maintains a reserve supply of compressed air in the intake manifold of the engine for acceleration thereof.

---

The invention relates to power plants of the type which comprises an internal combustion engine driving a turbine which, in turn, drives a compressor.

Power plants of the type described have a variety of uses including, but not limited to, the propulsion of aircraft and other vehicles.

Due to the fact that the blades of the turbine are so designed to operate effectively within limiting conditions of rotative speed and available gas volume, the rotor of the turbine cannot instantly accelerate from a rotative speed at engine idle to highly effective compressor rotation to produce the proper volume of air in the intake manifold of the internal combustion engine to properly combust the volume of fuel essential for rapid torque and horsepower availability.

The teachings of the present invention contemplate the provision of a more constant turbo-charger rotational speed and a larger volume of air from the turbo-charger into the air intake manifold of the internal combustion engine at low engine rotational speed; thus higher starting torque will be available when applying the engine to a work load.

According to the immediate foregoing, devices to limit fuel availability during acceleration may be eliminated; and thermal slack within the turbine will be lessened at low speeds since the operating range of the turbo-charger will be more constant.

Another advantage is the elimination of smoke during acceleration.

When the turbo-charger unit is applied to motor transport vehicles a higher starting gear may be utilized with resultant fuel economies available during operation in high gear, because of fewer engine revolutions per mile.

When the present invention is applied to a 2-cycle Diesel or gasoline engine, geared rotor blowers for scavenging may be eliminated, together with the provision of better low r.p.m. air rotors and higher horsepower availability because of the removal of the parasitic load of the gear driven compressor.

The foregoing and other objects and advantages will be more readily understood from the following specification and annexed drawings wherein like numerals designate like parts and wherein:

FIG. 3 is an enlarged elevational view, partly in section, of a back-pressure valve which functions to by-pass some of the exhaust gases in the exhaust manifold of the internal combustion engine into a distribution manifold which directs the same against the blades of the turbine of the turbo-charger unit, said back-pressure being shown in its closed position;

FIG. 4 is a view which is similar to that of FIG. 3 but wherein the back-pressure valve is in a partially open position;

FIG. 5 is a view which is similar to FIGS. 3 and 4 but illustrating the back-pressure valve in its fully open position.

Figure 1:
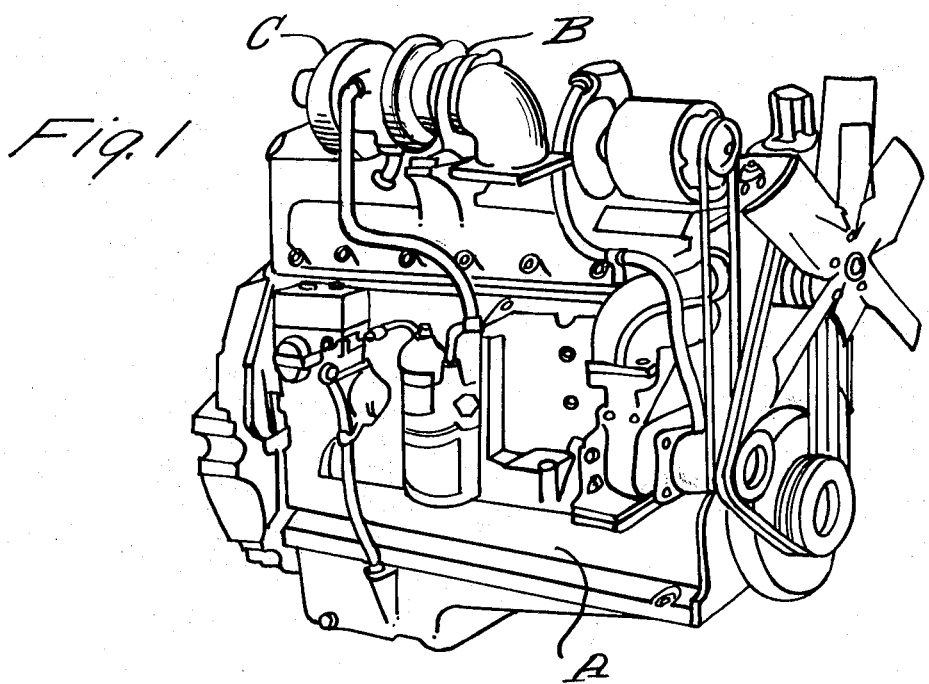
FIG. 1 is a schematic view illustrating a turbo-charger, comprising a turbine and a blower, which is driven by an internal combustion engine.
Figure 2:
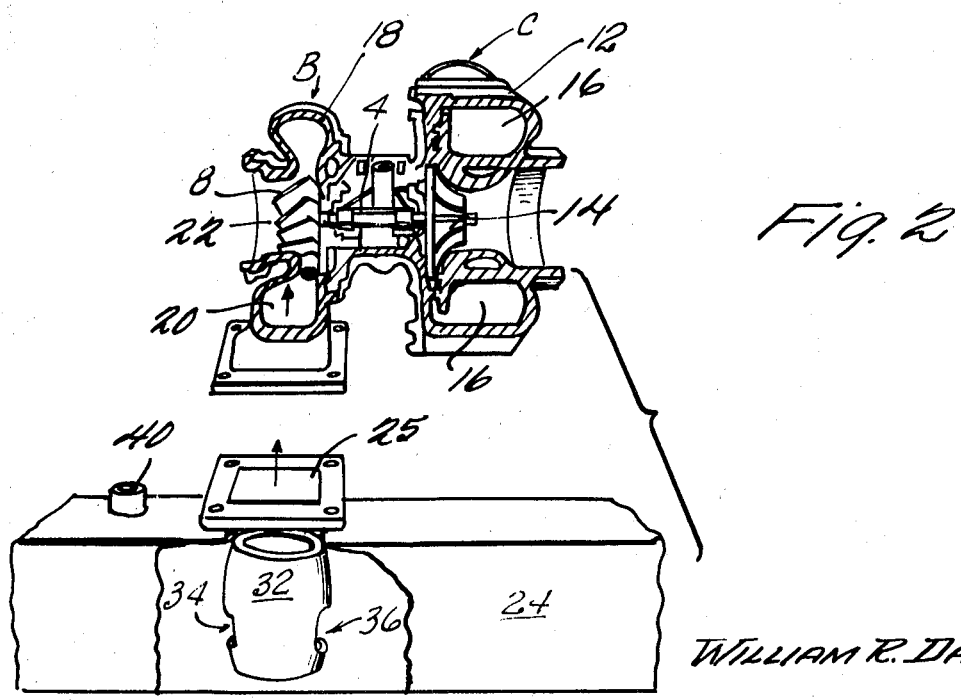
FIG. 2 is a fragmentary elevational view, partly in section, illustrating a portion of the exhaust manifold of the internal combustion engine together with the turbocharger which comprises the turbine and the blower which is associated therewith.

Referring to the schematic showing of FIG. 1, the numerals A, B and C generally designate a system comprising an internal combustion engine, a turbine, and a centrifugal blower (or compressor), respectively.

The internal combustion engine A may be of either 4-cycle or 2-cycle design and either gasoline or Diesel fueled.

In a manner which will be described hereinafter, the exhaust manifold of the engine A communicates with and supplies hot exhaust gases to the turbine B which drives the blower C and together with it forms the turbo-charger.

The turbine B is provided with the usual rotatable shaft 4 and rotor having vanes 8, the said rotatable shaft 4 being shown as extended into the housing 12 of the blower (or compressor) C.

That portion of the rotatable shaft which extends into the housing 12 of the blower carries a rotor 14 which is provided with the usual buckets 16.

The housing 18 of the turbine B is provided with an intake port 20 which communicates with the exhaust manifold 24 of the internal combustion engine A through a back-pressure valve to be later described. The exhaust port of the turbine B is shown at 22 as being axially disposed in the manner well-known in the art.

From the foregoing it will be perceived that exhaust gases emanating from the exhaust manifold 24 of the internal combustion engine A will contact the vanes 8 on the rotor of the turbine B, thus causing the rotation of the rotatable shaft 4 and, accordingly, the buckets 16 on the rotor 14 of the blower or compressor C.

Referring more particularly to FIG. 3 of the drawings, the aforementioned back-pressure valve is disposed within the exhaust manifold 24 of the internal combustion engine A; and it comprises a valve cage 32 which is circular in plan and provided at opposite points in its lower sidewall with a high-velocity valve port 34 and a volume gas port 36.

Disposed adjacent the back-pressure valve is a high-pressure gas port 40 which communicates with the interior of the exhaust manifold 24 of the internal combustion engine A and also with a by-pass pipe 42 which in turn communicates with a distribution manifold 46.

Figure 6:
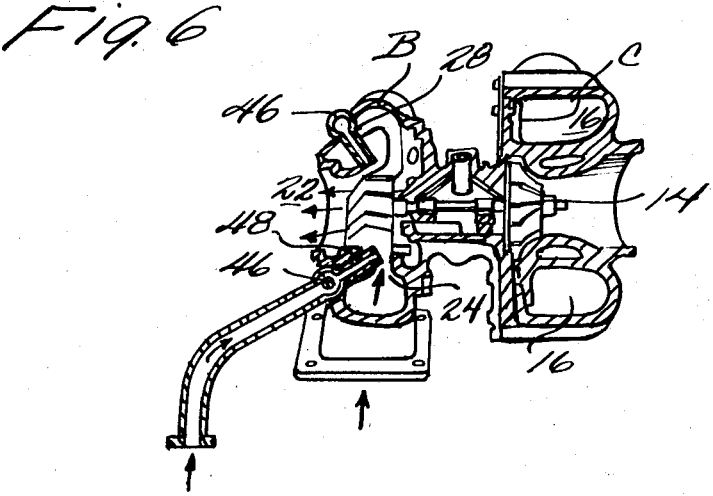
FIGS. 6 and 7 are detail views of certain of the components of the apparatus which will be fully described hereinafter.
Figure 7:
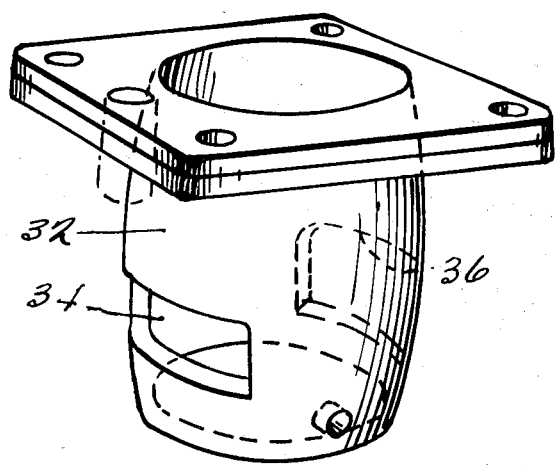

Referring to FIG. 6, the distribution manifold 46 is generally concentric with the housing 18 of the turbine B; and it is provided with a series of evenly spaced restricting nozzles 48 which direct compressed air or gas emanating from the exhaust manifold 24 of the internal combustion engine A onto the vanes 8 of the rotor on the rotatable shaft 4.

Disposed in the valve cage 32 is a sleeve-like slide valve 50 which is adapted to move upwardly by gas flow and downwardly by gravity to open and close the high-velocity valve port 34 and volume gas port 36.

Accordingly, the slide valve 50 in its bottom or closed position provides a block to compressed air or exhaust gas in the exhaust manifold 24 which would normally exit at slow engine speed and low volume through the intake port 20 of the turbine B and discharge through the exhaust port 22 in the housing 18 of the turbine B.

With the sleeve-like slide valve 50 in its lowermost (closed) position, the trapped air which may for example be under 125 to 175 p.s.i. is channeled through the high pressure gas port 40 and by-pass conduit 42 to the ring-like distribution manifold 46 in the housing 18 of the turbine B and through the restricting nozzles 48, causing the compressed air or gas issuing therefrom to impinge on the blades or vanes 8 and impart rotation to the rotor on the rotatable shaft 4.

Since the turbine B and blower C of the turbo-charger are coupled with a common rotatable shaft 4 the rotor 14 and buckets 16 of the blower C are caused to rotate. In so doing, atmospheric air is drawn into the centrifugal blower C and centrifugally discharged through a conduit 52 into the air intake manifold of the internal combustion engine A in the manner well-known in the art, thus building-up a positive pressure therein.

During and immediately following the building-up of the positive pressure in the air intake manifold of the internal combustion engine A both the fuel and ignition systems are disconnected therefrom. Thus, the internal combustion engine, being essentially an air compressor, the compressed air passes through its air intake manifold, through its intake valves and cylinders, and into its exhaust manifold 24.

The function of the back-pressure valve in the exhaust manifold 24 of the internal combustion engine A is to trap the compressed air now in the exhaust manifold and by-pass it through the high-pressure gas port 40, by-pass conduit 42, distribution manifold 46, restricting nozzles 48, and onto the blades or vanes 8 of the turbine B as previously described.

When the rotation of the common shaft 4 for the turbine B and blower C reaches an acceptable rate, the ignition and fuel systems of the internal combustion engine A are activated; and when the engine fires the turbo-charger is already in motion, and air under pressure in the intake manifold is available for assisting in the combustion of the fuel.

Referring to FIGS. 3, 4 and 5, it will be observed that adjacent its lower extremity the valve cage 32 in the back-pressure valve is provided on its side which is most adjacent to the high-pressure gas port 40 with a relatively small high-velocity valve port 34 and on its opposite side with a much larger volume valve port 36.

The lower end of the valve cage 32 is closed by a threaded circular disc or plug 64 having an annular gas groove 66 and immediately thereabove a continuous tapered valve seat 68. The inner face of the lowermost extremity of the slide valve 50 is provided with a continuous tapered valve surface 70 which conforms to, and cooperates with, the continuous tapered valve seat 68 on the circular closure disc 64 at the bottom of the valve cage 32.

At a position which is at approximately 90° with respect to the high-velocity valve port 34 and the much larger volume valve port 36, the threaded circular disc or plug 64 at the bottom of the valve cage 32 is provided with a boost opening 72, and the interior of the slide valve 50 is provided, at a point which is adjacent its upper end with an inertia shelf 74. The extreme upper end of the slide valve 50 is provided with circular radiation fins 76 and similar cooperating fins 78 are provided on the under-side of a copper radiator 80 which is screw-threadedly attached to the inner wall of the valve cage 32 at the top thereof.

From the foregoing construction and arrangement it will be perceived that when the slide valve 50 is in its lowermost and closed position the trapped compressed air escapes from the exhaust manifold 24 of the internal combustion engine A through the by-pass exhaust route comprising the high-pressure gas port 40, by-pass conduit 42, distribution manifold 46 and restrictive nozzles 48, to thereby cause the rotation of the rotor of the turbine B.

When the engine fires, a volume of gas is released into the exhaust manifold 24 which is far in excess of the ability of the (by-pass) high-pressure gas port 40 to evacuate it. This causes an instantaneous sharp pressure rise within the exhaust manifold 24, and the pressure increase builds-up force against the lower edge of the slide valve 50 which is held by gravity on its tapered valve surface 70 against the correspondingly tapered valve seat 68 on the closure disc or plug 64 at the bottom of the valve cage 32.

This sharp pressure increase enters the boost opening 72 in the side-wall of the valve body which communicates with the annular gas groove 66 on the closure disc or plug 64 at the bottom of the valve cage 32. As will be understood, the lower edge of the annular gas groove 66 is closed by the periphery of the disc or plug 64 and the upper edge thereof by the bottom edge of the slide valve 50 at the lower extremity of the valve surface 70.

When sufficient pressure, in pounds per square inch, is supplied to overcome the weight of the slide valve 50 it pops open and is lifted sufficiently to allow the gas trapped in the exhaust manifold 24 to enter the valve body or cage 32 through the high-velocity valve port 34 and leave the manifold by passing upwardly through the body of the slide valve. Part of this gas impinges against the bottom of the inertia shelf 74 adjacent the top of the slide valve 50. This inertia shelf 74 is an internal ridge with a lower side radius that when struck by the gases moving at high-velocity they tend to reverse their direction of flow and turn back into the main body of the flow. This reversal of the gas flow causes a positive lift against the force of gravity and tends to keep the slide valve 50 partly open.

When the slide valve 50 is in partially open condition, the exhaust manifold is operating at a substantially higher back pressure than would normally be the case with part of the exhaust gas passing through the by-pass route (high-pressure gas port 40, by-pass conduit 42 and distribution manifold 46) to the restrictive high-pressure nozzles 48; and the balance of the gas passing out of the normal exhaust outlet 25 of the exhaust manifold 24 to the usual diffuser ring of the turbine B, thus expending its expansion of velocity energy against the vanes 8 on the rotor of the turbine.

Because of this back-pressure effect that accelerates the flow of gas in low volume, an appreciable increase in the rate of turbo-charger rotation will be made at low revolutions per minute of the internal combustion engine A. When the engine is accelerated a greater flow of gas further opens the slide valve 50 until at partial throttle, and a high idling speed of around 1,000 revolutions per minute, the slide valve 50, continuing to be held open by the rapid exhaust flow, no longer generates a back pressure effect.

When held in its open position, the slide valve 50 dissipates some of the heat acquired during its operation through the radiation fins 76 on its upper end and its engagement with the interfitting fins 78 on the lower edge of the copper radiator 80.

When the air passing through the intake valve port enters the combustion chamber of the internal combustion engine A there is a larger fuel charge to be combusted when operating with the apparatus of the invention than would otherwise be the case. This is due to the compressed state of the air with its larger volume of oxygen than air at atmospheric pressure; thus allowing a larger fuel charge to be burned with each firing cycle.

This additional fuel burning capability provides additional engine power available at the crankshaft as torque and horsepower. This increased torque and horsepower provides for increased low speed acceleration with the attendant advantages thereof.

Having thus disclosed the invention, what I claim as new and desire to secure by Letters Patent is:

1. A turbo-charger system comprising, in combination, an internal combustion engine;
pressure-responsive valve means for receiving gases from the exhaust manifold of said internal combustion engine;
a turbine having an intake port communicating with said valve means;
a compressor driven by said turbine;
said compressor having an intake port communicating with the atmosphere and an exhaust port communicating with the air intake system of said internal combustion engine;
a distribution manifold;
a series of reduced-orifice nozzles communicating with said distribution manifold;
said reduced-orifice nozzles being disposed to eject gases onto the blades of said turbine;
a by-pass port in the exhaust manifold of said internal combustion engine; and
means connecting said by-pass port wtih said distribution manifold;
said pressure-responsive valve means being adapted to provide commounication between the exhaust manifold of said internal combustion engine and the intake port of said turbine when pressures therewithin are beyond the capacity of said by-pass port;
said pressure-responsive valve means including a substantially vertically disposed cage and being biased only by gravity, and a sleeve slidably disposed in said cage.

2. A turbo-charger system comprising, in combination, an internal combustion engine;
pressure-responsive valve means for receiving gases from the exhaust manifold of said internal combustion engine;
a turbine having an intake port communicating with said valve means;
a compressor driven by said turbine;
said compressor having an intake port communicating with the atmosphere and an exhaust port communicating with the air intake system of said internal combustion engine;
a distribution manifold;
a series of reduced-orifice nozzles communicating with said distribution manifold;
said reduced-orifice nozzles being disposed to eject gases onto the blades of said turbine;
a by-pass port in the exhaust manifold of said internal combustion engine; and
means connecting said by-pass port with said distribution manifold;
said pressure-responsive valve means being adapted to provide communication between the exhaust manifold of said internal combustion engine and the intake port of said turbine when pressures therewithin are beyond the capacity of said by-pass port;
said pressure-responsive valve means including a substantially vertically disposed cage having a high-velocity valve port and a volume valve port; a slidably disposed sleeve in said substantially vertically disposed cage; said sleeve being adapted to seat in said substantially vertically disposed cage in a position which interrupts communication between the interior thereof and its high-velocity valve port and said volume valve port; and means communicating with the exhaust manifold of said internal combustion engine and the bottom edge of said slidably disposed sleeve for raising the latter upon increase in pressure beyond a predetermined level to open said high-velocity valve port and said volume valve port.

References Cited

UNITED STATES PATENTS

| | | | |
|---|---|---|---|
| 1,816,787 | 7/1931 | Moss | 60—13 |
| 2,369,175 | 2/1945 | Prince | 60—13 |
| 2,567,486 | 9/1951 | Johansson | 60—13 |
| 2,578,028 | 12/1951 | Udale | 60—13 |
| 2,838,907 | 6/1958 | Cowland | 60—13 |
| 3,077,736 | 2/1963 | Feeley | 60—13 |
| 3,270,495 | 9/1966 | Connor | 60—13 |

FOREIGN PATENTS

| | | | |
|---|---|---|---|
| 288,217 | 6/1928 | Great Britain | 60—13 |

DOUGLAS HART, Primary Examiner